Jan. 11, 1927. H. N. EDENS Re. 16,528
DEVICE FOR REGULATING TEMPERATURE OF AIR IN CARBURETORS
Original Filed Sept. 9, 1918
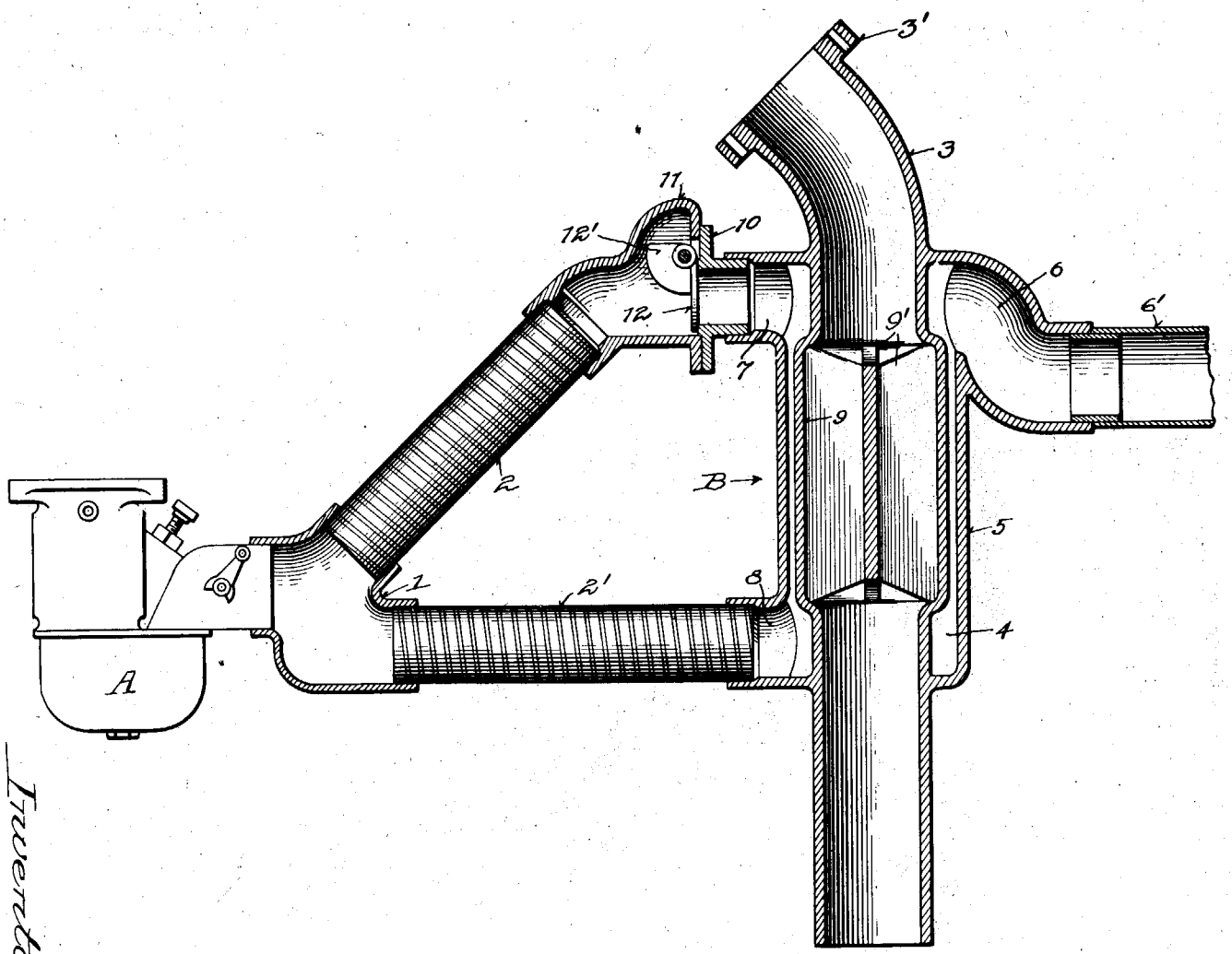
Witness:
F. C. Larson
Inventor:
Henry N. Edens
By Brown, Boettcher & Dienner
Attys Reissued Jan. 11, 1927.

Re. 16,528

UNITED STATES PATENT OFFICE.

HENRY N. EDENS, OF NEW HOLSTEIN, WISCONSIN, ASSIGNOR, BY MESNE ASSIGNMENTS, TO WAUKESHA MOTOR COMPANY, OF WAUKESHA, WISCONSIN, A CORPORATION OF WISCONSIN.

DEVICE FOR REGULATING TEMPERATURE OF AIR IN CARBURETORS.

Original No. 1,512,527, dated October 21, 1924, Serial No. 253,344, filed September 9, 1918. Application for reissue filed October 17, 1925. Serial No. 63,159.

This invention relates to means for regulating the temperature of air supplied to a carburetor and is particularly adapted for use in connection with the vaporization or gasifying of kerosene to be used as fuel in internal combustion engines.

It is a well established fact that kerosene as a fuel for internal combustion engines can be used successfully under two conditions, namely:—by maintaining a high velocity of air through the carburetor inlet and by applying heat to the fuel, air or mixture. Great difficulty, however, has been encountered in maintaining the velocity and temperature of air at the proper ratio to the speed of the engine. When the engine is traveling under light load and at low speed the velocity of air is necessarily low. Therefore, it is desired to maintain a high temperature in order to obtain a proper mixing of the air and fuel. Under heavy load and at high speed of the engine the velocity of the air, drawn into the carburetor, is increased sufficiently to obtain the proper mixing of the fuel and it not only becomes unnecessary to maintain a high temperature of the air but is objectionable due to the fact that heated air becomes rarefied to the extent that its thermal efficiency is reduced thereby causing a loss of power.

In order to overcome these difficulties and to meet the varying conditions which exist, it is the object of the present invention to provide a device adapted to regulate the temperature of the air supplied to a carburetor whereby upon low speed of the engine and low velocity of the air passing to the carburetor the temperature of the air is raised and upon increasing the speed of the engine and the velocity of the air the temperature of the same is lowered.

A more specific object of the invention is the provision of a device of the character herein described having automatically actuated means for controlling the direction of the flow of air therethrough.

With these and other objects in view the invention consists in what is herein shown and described, it being appreciated that changes in the minor details and the precise embodiment may be made by one skilled in the art without departing from the invention.

The invention in one practical form in which it may be embodied is illustrated in the accompanying drawing in which:

The single figure shown is a transverse sectional view through the invention showing the same attached to a carburetor.

Referring more particularly to the accompanying drawing A designates a conventional type of carburetor used in the carburation of kerosene for internal combustion engines, the construction of which forms no part of the present invention. Attached to the air intake port of the carburetor A is a Y-fitting 1 which is provided with a pair of conduits 2 and 2′, preferably constructed of flexible tubing as shown and which connect the carburetor with the air temperature controlling device B consisting of an exhaust conduit 3 provided with a flange 3′ adapted to be secured to a manifold, not shown, through which the heated gases from the engine pass.

Cast integrally with the exhaust conduit 3 and forming a chamber 4 surrounding the same is a jacket 5 provided at its upper end with an inlet port 6 having an inlet pipe 6′ leading to any suitable place for the intake of air. The jacket 5 is also provided with an outlet port 7 aligned with the inlet port 6 and an additional outlet port 8 positioned at the lower end of the jacket 5. The portion 9 of the exhaust pipe which is positioned between the two outlet ports is slightly enlarged to form a restricted passage in the chamber 4 between the inlet 6 and the outlet 8.

Formed interiorly of the exhaust pipe within the enlarged portion 9 are ribs 9′ adapted to absorb the heat from the escaping gases and transmit the same to the walls of the exhaust pipe whereby the air passing through the chamber 4 from the inlet 6 to the outlet 8 is heated. Fitted into the outlet port 7 is a flanged connection 10 having attached thereto a valve casing 11 in which is pivoted a valve 12 having a weighted counter-balanced portion 12′ to normally hold the valve in position to prevent gases passing through the outlet 7.

Thus it will be seen that a pair of air passages are formed between the inlet 6 and carburetor, one of which extends from the inlet 6 through the chamber 4, outlet 8, and conduit 2′ to the Y-fitting 1, while the other passage extends from the inlet 6 to the aligned outlet 7 thence, through the valve casing into the conduit 2 and Y-fitting 1, from which it enters the carburetor.

The operation of the device is as follows:—When the engine is at low speed a low vacuum is created within the carburetor which is insufficient to overcome the counter-balanced valve 12, thereby causing the air to enter the inlet 6 and pass through the chamber 4 where it is heated and passes through the outlet 8 and conduit 2′ of the carburetor. Upon increasing the speed of the engine the vacuum created within the carburetor is necessarily increased which causes an unequal pressure upon the valve 12 sufficient to overcome the counter-balance thereby causing the valve to swing open permitting the air to pass directly from the inlet 6 through the outlet 7 and valve casing 11 from thence through the conduit into the carburetor. The air thus passing directly from the inlet 6 through the outlet 7, without passing through the chamber 4, is consequently low in temperature and will, therefore, mix with any air which might be drawn through the chamber 4 thereby reducing the temperature of the entire volume of air entering the carburetor to a point desired for successful mixing with the fuel.

From the foregoing description taken in connection with the drawing it will be seen that a simple, economical and efficient device for regulating the temperature of air to the carburetor has been constructed which is entirely automatically controlled by the suction exerted by the engine and which will maintain the temperature of the air at a proper ratio to the varying speed of the engine.

What I claim as new is:—

1. In combination with a carburetor, a device of the class described comprising a chamber provided with an inlet and a pair of outlet ports, heating means positioned within said chamber, conduits connecting the carburetor and said outlet ports to form a pair of air passages, one of said conduits being disposed in more intimate contact with said heating means than the other of said conduits and automatically actuated means for controlling the relative flow of air through the air passages to the carburetor.

2. In combination with a carburetor, a device of the class described comprising a chamber provided with an inlet and a pair of outlet ports, heating means positioned within said chamber, conduits connecting the carburetor with said outlet ports to form a pair of air passages, and yieldable means positioned within one of said passages and operated by the suction of the engine to regulate the flow of air therethrough, the outlet port of said last mentioned passage being closer to said inlet port than the other of said outlet ports.

3. In combination with a carburetor, a device of the class described comprising an exhaust pipe, a jacket surrounding the exhaust pipe and provided with an inlet and a pair of outlet ports, a valve casing attached to one of said outlet ports, said inlet port being closer to said last mentioned outlet port than to the other of said outlet ports, a yieldable valve mounted within said casing, and controlled by the suction of the engine and conduits connecting the carburetor with said valve casing and the other of said outlets.

4. In combination with a carburetor, a device of the class described comprising an exhaust pipe, a jacket surrounding the exhaust pipe and provided with aligned inlet and outlet ports at one end of the jacket and a second outlet port at the opposite end of said jacket, a valve casing attached to the first mentioned outlet port, a yieldable valve mounted within said casing, and controlled by the suction of the engine and conduits connecting the carburetor with said valve casing and the other of said outlets.

5. In combination with a carburetor, a device of the class described comprising a conduit leading to the carburetor, a second conduit connected at its ends with said first-named conduit, heating means disposed in more intimate relation to one of said conduits than the other, and automatically actuated means for controlling the relative flow of air through said conduits to the carburetor decreasingly through the hotter conduit as suction increases.

6. In combination with a carburetor, a device of the class described having an inlet and an outlet connected by a conduit, a chamber having heating means associated therewith and having an inlet fed from said first-named inlet and an outlet feeding said first-named outlet, and automatically actuated means for controlling the relative flow of air through said conduit and said chamber decreasingly through said chamber as suction increases.

7. In combination with a carburetor, a device of the class described comprising a conduit leading to the carburetor, a second conduit leading to the carburetor, means for heating said second conduit, said first conduit being relatively unheated, and a suction responsive valve normally closing said first conduit to pass incoming air through said heated conduit.

In witness whereof I have hereunto set my hand at Milwaukee, Wisconsin, this 14th day of October, 1925.

HENRY N. EDENS.